No. 888,351. PATENTED MAY 19, 1908.
W. C. RAGSDALE.
COTTON BALE TIE.
APPLICATION FILED JUNE 21, 1907.
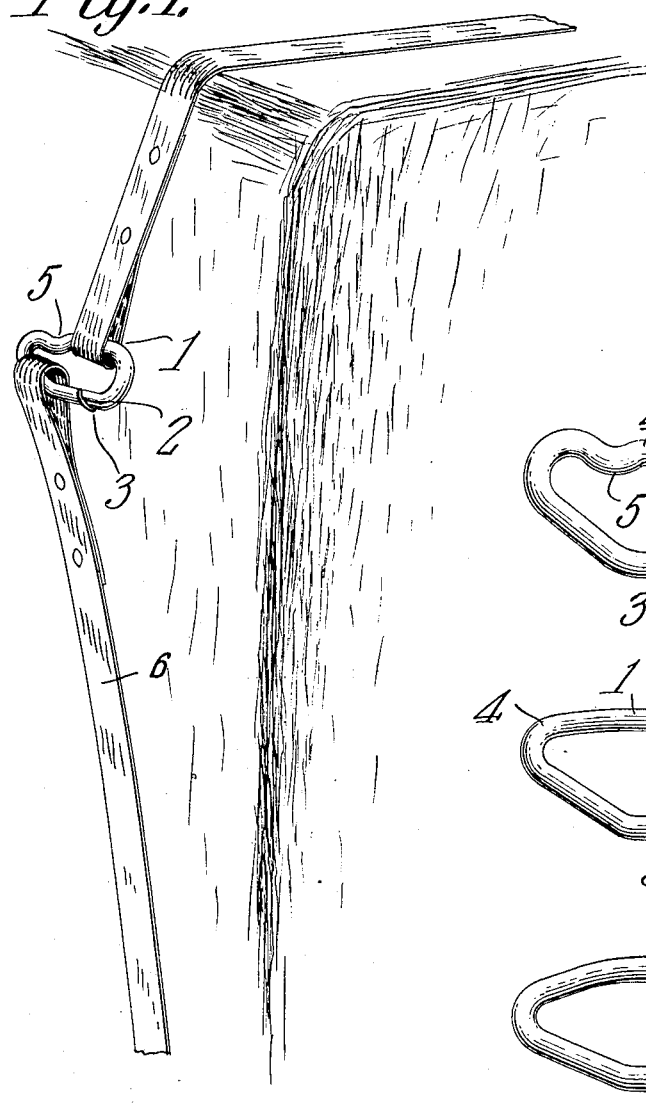
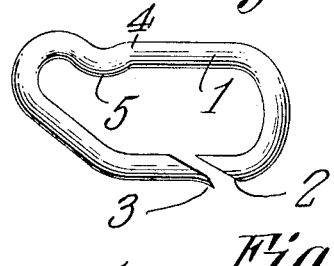
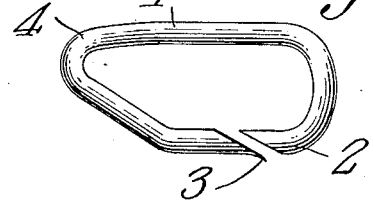
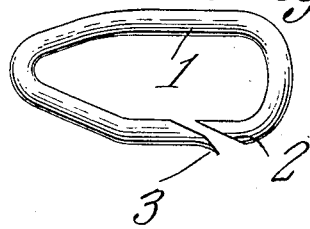
WITNESSES:
William C. Ragsdale,
INVENTOR.
By C. A. Snow & Co.
ATTORNEYS

UNITED STATES PATENT OFFICE.

WILLIAM C. RAGSDALE, OF OKLAHOMA, OKLAHOMA, ASSIGNOR OF ONE-HALF TO CARL F. MOORE, OF OKLAHOMA, OKLAHOMA.

COTTON-BALE TIE.

No. 888,351.     Specification of Letters Patent.     Patented May 19, 1908.

Application filed June 21, 1907. Serial No. 380,144.

*To all whom it may concern:*

Be it known that I, WILLIAM C. RAGSDALE, a citizen of the United States, residing at Oklahoma city, in the county of Oklahoma, Oklahoma, have invented a new and useful Cotton-Bale Tie, of which the following is a specification.

This invention has relation to bale ties and it consists in the novel construction and arrangement of its parts as hereinafter shown and described.

The object of the invention is to provide a tie of simple and cheap construction which is of a durable nature and adapted to securely retain the ends of the bale band together.

In the accompanying drawings:—Figure 1 is a perspective view of end portions of a bale band illustrating the manner of applying the tie thereto. Fig. 2 is a side elevation of one form of the tie loop. Fig. 3 is a side elevation of a modified form thereof, and Fig. 4 is a side elevation of still another modified form of the loop.

The tie consists of a loop 1 made from round, spring wire. The ends of the wire are chamfered as at 2 and the said chamfered ends lie directly opposite each other. That end of the wire which is provided with an acuminated edge at the outer side of the loop is swaged laterally as at 3 forming a lip which extends slightly beyond the general perimeter of the loop. The chamfered ends 2 occur at one side of the loop.

While the accompanying drawings illustrate several different forms of the invention they all in general approach an ovate configuration in side elevation. In the form of the invention as shown in Fig. 4 the loop is substantially on the form of a true oval; while in the form of the invention as shown in Fig. 3 the loop is slightly distorted so that the loop has one side 4 flatter than the opposite side. In the form of the invention as shown in Fig. 2 the distorted form of oval is employed but the flattened side 4 thereof is provided with an inward kink 5.

In applying the tie one end of the bale band 6 is passed around that side of the loop opposite the chamfered ends thereof and is riveted to the body of the band. The bale band is then carried around the bale and is subjected to tension when the opposite looped end of the band is slipped laterally between the chamfered ends of the loop the lip 3, forming a guide for the edge of the bale band in gaining an entrance between the chamfered ends 2. After the last said end of the bale band is slipped over one end portion of the loop it is moved laterally toward and over the opposite end portion and is made to straddle both end portions. The said band will be held in this position by the peculiar configuration of the loop and neither end of the band can move laterally and become displaced. Thus a simple and effective bale tie is provided and as it is made of round spring wire it is not liable to rupture or cut the band.

Having described my invention what I claim as new and desire to secure by Letters-Patent is:—

A bale tie comprising a metallic loop made of wire having chamfered ends lying opposite each other that end of the wire which is provided with an acuminate edge at the side of the loop having a laterally disposed lip lying in the same plane as that occupied by the body of the tie.

In testimony that I claim the foregoing as my own, I have hereto affixed my signature in the presence of two witnesses.

WILLIAM C. RAGSDALE.

Witnesses:
    HUGH E. HANES,
    E. S. SWAN.